US006427970B1

(12) United States Patent
Silva

(10) Patent No.: US 6,427,970 B1
(45) Date of Patent: Aug. 6, 2002

(54) HEAT DISSIPATING VOICE COIL ACTIVATED VALVES

(75) Inventor: Gabriel Silva, Liverpool, NY (US)

(73) Assignee: Young & Franklin, Inc., Liverpool, NY (US)

( * ) Notice: Subject to any disclaimer, the term of this patent is extended or adjusted under 35 U.S.C. 154(b) by 0 days.

(21) Appl. No.: 09/810,626

(22) Filed: Mar. 16, 2001

(51) Int. Cl.[7] ................................................ F16K 31/02

(52) U.S. Cl. ................... 251/129.01; 251/905; 137/338

(58) Field of Search .............................. 251/65, 129.01, 251/318, 355, 905; 137/338, 625.64, 554, 375

(56) References Cited

U.S. PATENT DOCUMENTS

| | | | | |
|---|---|---|---|---|
| 4,596,177 A | | 6/1986 | Biafore | 91/35 |
| 4,933,975 A | * | 6/1990 | Button | 381/397 |
| 4,966,065 A | | 10/1990 | Wardle | 91/361 |
| 5,076,537 A | | 12/1991 | Mears, Jr. | 251/65 |
| 5,388,607 A | * | 2/1995 | Ramaker et al. | 137/487 |
| 5,460,201 A | | 10/1995 | Borcea et al. | 137/625.65 |
| 5,586,435 A | | 12/1996 | Kokalis | 60/416 |
| 5,960,831 A | | 10/1999 | Borcea et al. | 137/625.65 |
| 5,975,118 A | * | 11/1999 | Ulicny et al. | 137/338 |
| 5,996,464 A | | 12/1999 | McLevige et al. | 91/361 |
| 6,068,785 A | * | 5/2000 | Raj et al. | 252/62.52 |
| 6,222,289 B1 | * | 4/2001 | Adames | 310/52 |

* cited by examiner

*Primary Examiner*—Lesley D. Morris
*Assistant Examiner*—Patrick Buechner
(74) *Attorney, Agent, or Firm*—Wall Marjama & Bilinsk LLP

(57) ABSTRACT

An electromechanical valve that includes a cylindrical housing having a first axially disposed chamber containing a valve body and a spool reciprocally mounted in the body for movement along the axis of the housing. A second chamber is located within the housing adjacent to the first chamber which contains a voice coil actuator having a coil holder that is coupled to the spool so that the spool moves linearly when a current is applied to the coil. Materials having a high thermal conductivity are placed in the voice coil actuator for rapidly transmitting heat energy generated in the coil to the housing so that the energy is dissipated into the surrounding ambient before it can damage the actuator.

25 Claims, 5 Drawing Sheets

HEAT DISSIPATING VOICE COIL ACTIVATED VALVES

FIELD OF THE INVENTION

This invention relates generally to apparatus for rapidly dissipating the heat energy generated by a voice coil actuator that is used to control the positioning of a valve spool.

BACKGROUND OF THE INVENTION

As evidenced by U.S. Pat. No. 5,460,201 to Borcea et al. and U.S. Pat. No. 5,076,537 to Mears, Jr., linear voice coil actuators have been used for some time in association with spool type valves to control the positioning of the valve spool. The voice coil actuator generally involves a tubular wire coil located within a magnetic flux field provided by a stationary magnet. Applying an electrical current to the coil produces a directional force that is proportional to the current input producing relative motion between the magnet and the coil. Typically, the magnet is stationarily mounted and the coil is suspended in a frame within the flux field so that the frame moves linearly when a current is applied to the coil. In a spool valve application, the coil frame is coupled to valve spool and the position of the spool controlled by regulating the amount of current applied to the coil and the direction of current flow. Voice coil actuators have reliable operating characteristics, are generally hysteresis free and provide a smooth motion that makes them ideally well suited for use in controlling the operation of a spool valve.

Voice coil actuators, however, tend to generate a good deal of heat, particularly when the valve is cycled frequently over a relatively extended period of time. When housed in a compact package, the heat can build up rapidly to a point where the coil is damaged, thus rendering the actuator inoperative. By the same token, any electrical components located in close proximity with an overheated actuator can also become dangerously overheated.

SUMMARY OF THE INVENTION

It is therefore a primary object of the current invention to improve the heat dissipating characteristics of voice coil activated spool type valves.

A further object of the present invention is to improve the operation of spool valves by use of a voice coil actuator.

Another object of the present invention is to mount a spool type valve, a voice coil actuator for positioning the valve spool and electrical control components associated with the actuator in a compact package so that the actuator coil and the electronic components are not damaged by heat generated by the coil.

Yet another object of the present invention is to extend the operating life of a voice coil operated spool type valve by improving the heat dissipation characteristics of the valve.

These and other objects of the present invention are attained by a voice coil activated spool valve that includes a housing having a first chamber that contains a valve sleeve and a valve spool mounted for reciprocal movement within the sleeve along the axis of the housing. The housing further contains a second chamber adjacent the first chamber. The second chamber contains a linear voice coil actuator having a stationary magnet and a movable coil frame that is connected to the valve spool so that the spool is positionable when a current is applied to the coil. A thermally conductive polymer is placed between the outer surfaces of the actuator assembly and adjacent surfaces of the housing so that heat energy generated by the coil is rapidly transferred to the housing and the surrounding ambient. A highly conductive ferrofluid is also placed in the flux region of the magnet so that internal heat stored in the core of the actuator is transferred rapidly to the outer surface of the actuator. Fins are placed along the outside of the housing to further aid in the dissipation of heat to the surrounding ambient.

BRIEF DESCRIPTION OF THE DRAWING

For a better understanding of these and objects of the invention, reference will be made to the following detailed description of the invention which is to be read in connection with the accompanying drawing, wherein.

DETAILED DESCRIPTION OF THE INVENTION

Figure 1:
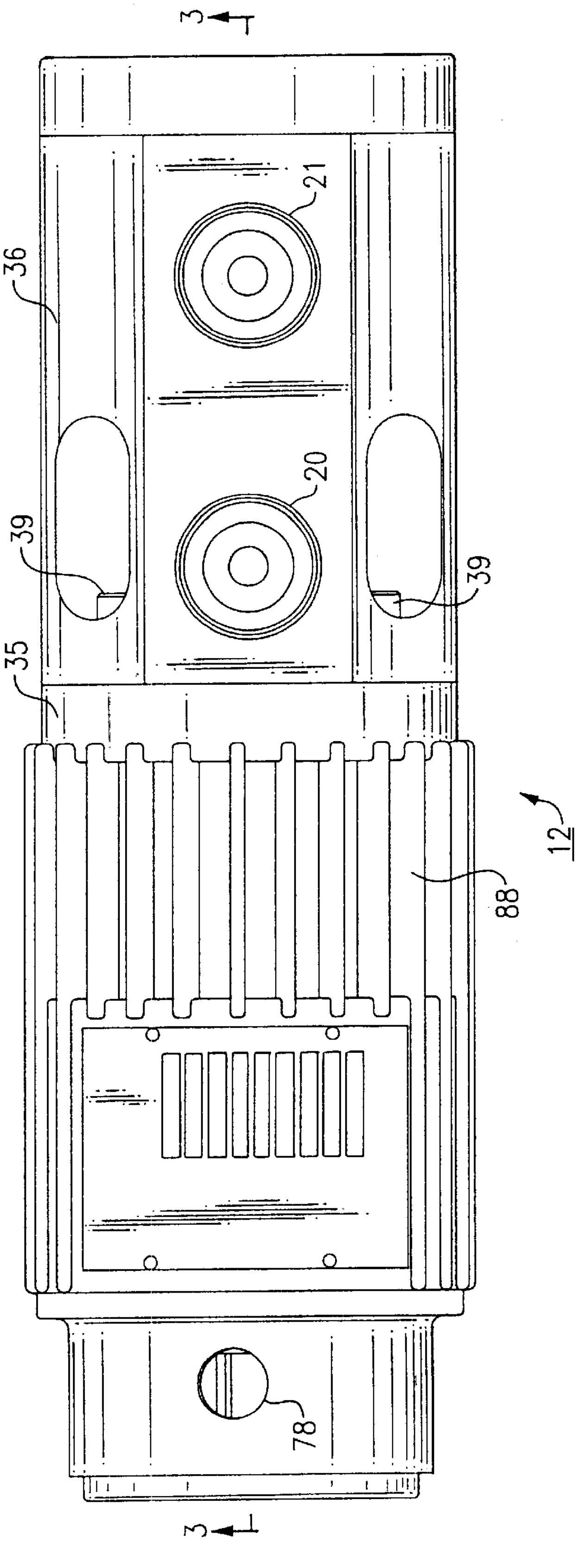
FIG. 1 is a top view of a spool valve embodying the teachings of the present invention.
Figure 2:
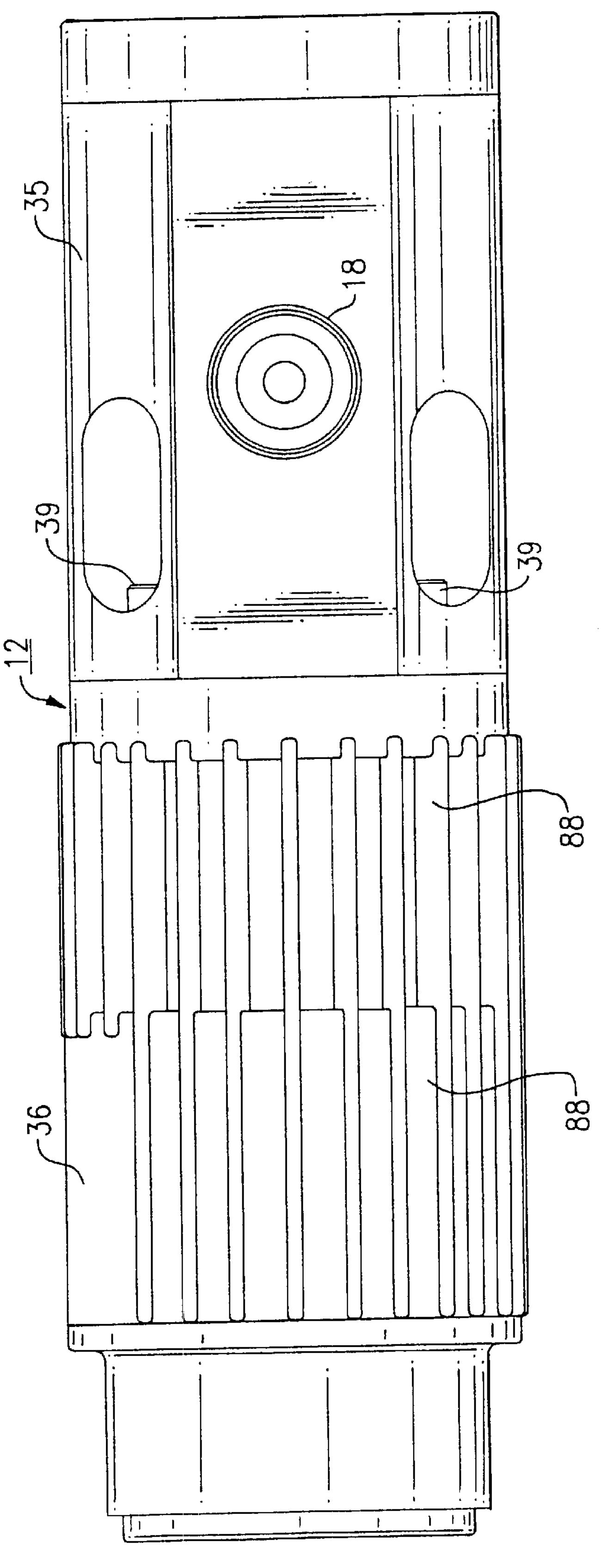
FIG. 2 is a bottom view of the valve illustrated in FIG. 1.
Figure 3:
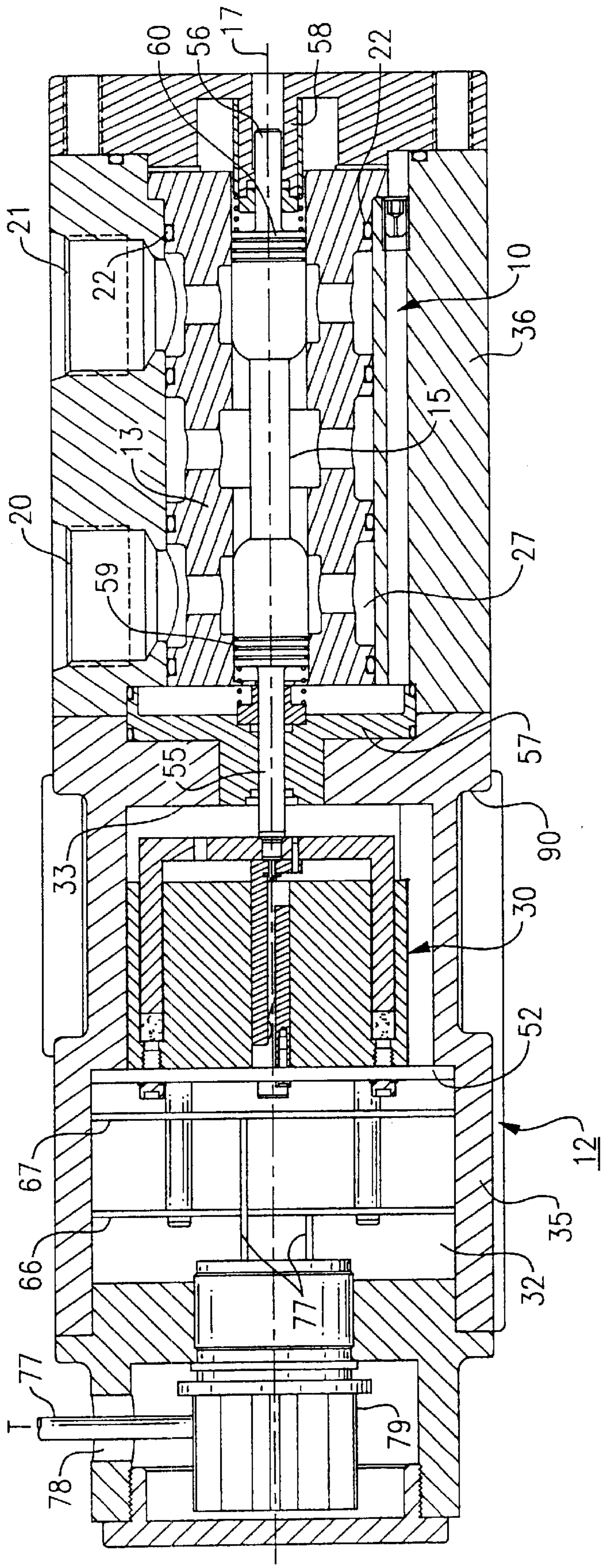
FIG. 3 is a section view taken along lines 3—3 in FIG. 1.

Referring initially to FIGS. 1–3, there is illustrated a liquid fuel splitter valve, generally referenced 10 that is contained within a cylindrical housing 12. The valve 10 further includes a cylindrical valve body or sleeve 13 in which a spool 15 is slidably mounted for reciprocal movement along the central axis 17 of the housing. An inlet port 18 (FIG. 3) to the valve is located in the lower part of the housing and a pair of outlet ports 20 and 21 are located in the upper part of the housing. The splitter valve is of conventional design and is arranged so that an incoming fluid can be selectively routed to one of the outlet ports by selectively positioning the spool along the axis of the housing. Suitable seals 22-22 are provided to prevent the in process fluid from escaping from the valve region.

Although the present invention will be described with specific reference to splitter valve, it should become evident from the disclosure below that the present invention is not restricted to this particular valve and is applicable for use in association with various types of valves employing a spool for controlling the flow of a fluid.

The valve is located in a first chamber 27 within the housing which will herein be referred to as the valve chamber. A voice coil actuator generally referenced 30, is also contained within the housing in a second chamber 32 that is adjacent the first chamber and separated therefrom by a wall 33. The second chamber will herein be referred to as the actuator chambers. In practice, the housing is divided into two sections 35 and 36 with the first section containing the valve 10 and the second section 36 containing the voice coil actuator 30. The sections are joined together at the wall 33 and are secured in assembly by a series of bolts 39-39 (See FIGS. 1 and 2). Dividing the housing as illustrated facilitates assembly of the components contained within the housing.

Figure 4:
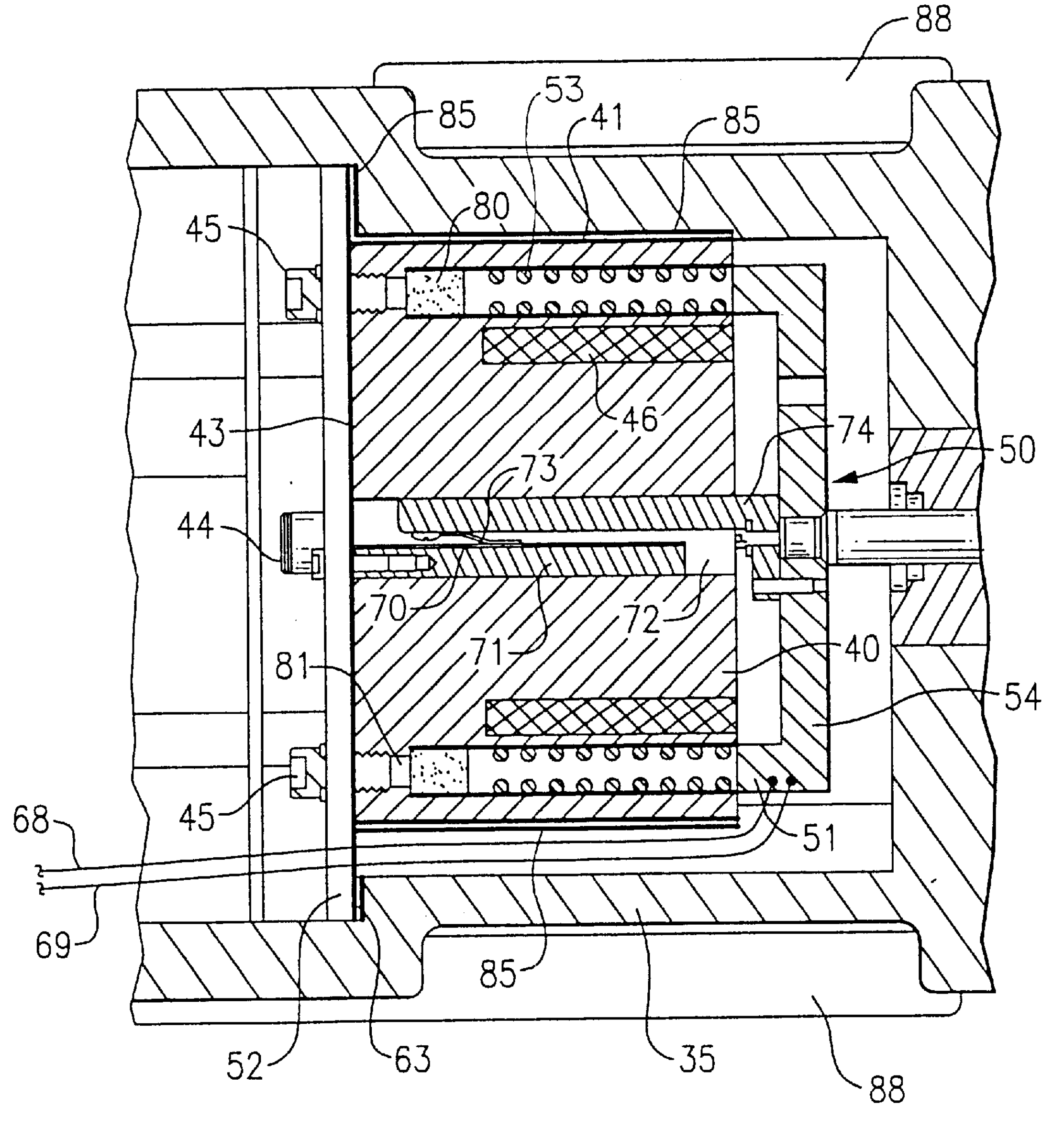
FIG. 4 is an enlarged partial view in section illustrating voice coil actuators employed in the practice of the present invention.

With further reference to FIG. 4, the voice coil actuator 30 is a conventional design and includes a cylindrical soft iron ferromagnetic core 40 that is surrounded by a tubular soft iron ferromagnetic shell 41 that surrounds the core to establish an annular air gap 81 therebetween. In practice, the core and the shell can be fabricated from the same piece of material. A permanent magnet 46 is embedded in either the shell or the core to establish a flux field within the air gap. A non-permeable end flange 52 is secured thereto using screws 44. Threaded plugs 45 are passed through the end flange and are threaded into the back of the air gap, the purpose of which will be explained in greater detail below. A coil holder, generally referenced 50 is inserted into the air gap of the actuator. The holder includes a cylindrical body 51 about which a wire coil 53 is wound and a circular end wall 54 that is located adjacent to the wall 33 that divides the two housing chambers. Two lead wires 68 and 69 are attached to wall 52 to provide current to the coil. A specially designed groove in the housing 35 allows the wires to be connected to a controller that includes circuit boards 66 and 67. The actuator sleeve forms a close running fit with the inner wall of the actuator chamber so that the actuator is axially aligned with the central axis of the housing.

The spool contains a pair of end shafts 55 and 56 that are carried in suitable linear bearings mounted within bearing blocks 57 and 58, respectively. End shaft 55 is arranged to pass through the dividing wall 33 of the housing and is connected by any suitable coupling to the end flange 52 of the coil holder 50 so that axial movement of the coil holder will cause the valve spool to be repositionable. In assembly, the spool is held in a neutral position by means of opposed failsafe springs 59 and 60 thereby preventing fluid from passing through the valve. Repositioning of the valve spool is achieved by applying a current to the actuator coil. The direction of current flow through the coil determines the direction of movement of the coil holder while the force generated by the current flow is a function of the amount of current applied to the coil and the magnetic flux density in the air gap.

The end flange 52 of the actuator assembly extends radially beyond the shell and is seated in a shoulder 63 formed in actuator chamber and secured in place using any suitable means such as threaded fasteners or the like (not shown). A pair of radially disposed spaced apart circuit boards 66 and 67 are mounted within the actuator chamber 32 immediately behind the actuator assembly. The boards contain circuitry of a digital controller that is arranged to regulate the activity of the voice coil actuator and thus, the positioning of the valve stem. The controller circuitry is connected both to the coil wires 68 and 69 and to an elongated stationary contact blade 70 mounted upon a pad 71 in parallel alignment with the axis of the housing. The pad is located within a hole 72 provided in the actuator core. A moveable wiper blade 73 is secured to the end wall of the coil holder by a beam 74 and moves with the coil holder to provide accurate positioning information to the controller. The controller, in response to input commands, causes suitable current to be applied to the actuator coil so as to move the spool to a desired location. Command leads 77 to the controller as passed through an opening 78 in the rear of the housing and through terminal block 79.

As illustrated in FIG. 4 ferrofluid 80, having a high thermal conductivity, is injected into the actuator air gap through the threaded plug holes 81. The ferrofluid is applied to the magnetized surfaces of the actuator using a syringe. The fluid fills the vacant spaces in the air gap and thus provides a path of travel over the gap such that heat generated in the core and coil region of the actuator is transferred rapidly to the outer surfaces of the housing 35 which is adjacent to and in close proximity with the inner wall of the housing. Suitable ferrofluids having high thermal conductivity are commercially available through Ferrofluidics Corp. having a place of business in Chanhassen, Minn.

The inside surface of the actuator end flange, as well as the outer surface of the actuator shell are coated with a polymer material 85 that also has a high thermal conductivity. The polymer fills the region between the end flange and the housing and the shell and the housing to provide a highly conductive path over which heat generated by the voice coil actuator can be transferred to the housing. Polymers having a high thermal conductivity around 1.5 W/m-K suitable for use in this application are available from the Bergquist Company that has a place of business in Nashua, N.H. The housing is preferably fabricated of a non-magnetizable material, such as aluminum or stainless steel, both of which have a relatively high thermal conductivity. The outer surface of the housing, in turn, is provided with laterally extended cooling fins 88-88, particularly in and about the region overlying the voice coil actuator. The fins serve to discharge the heat energy in the housing to the surrounding ambient. To aid in the dissipation of heat from the housing, the thickness of the housing wall surrounding the actuator is reduced by forming a circular groove 90 within this region.

As can be seen, the present invention enhances the flow of heat away from the voice coil and rapidly discharges the energy into the surrounding ambient. As a result of this controlled rapid heat flow out of the housing, the valve and the actuator can be mounted in a side-by-side relationship within an extremely compact package, that is a package of a size such that the heat generated by the coil would ordinarily lead to early failure of the coil itself. It should also be evident from the present disclosure because of the rapid dissipation of heat energy from the housing, it is now possible to store many of the electronic control components in the package in close proximity with the voice coil actuator without the danger of the components becoming heat damaged. Accordingly, the need for long wire connections is eliminated and all problems associated therewith eliminated.

Figure 5:
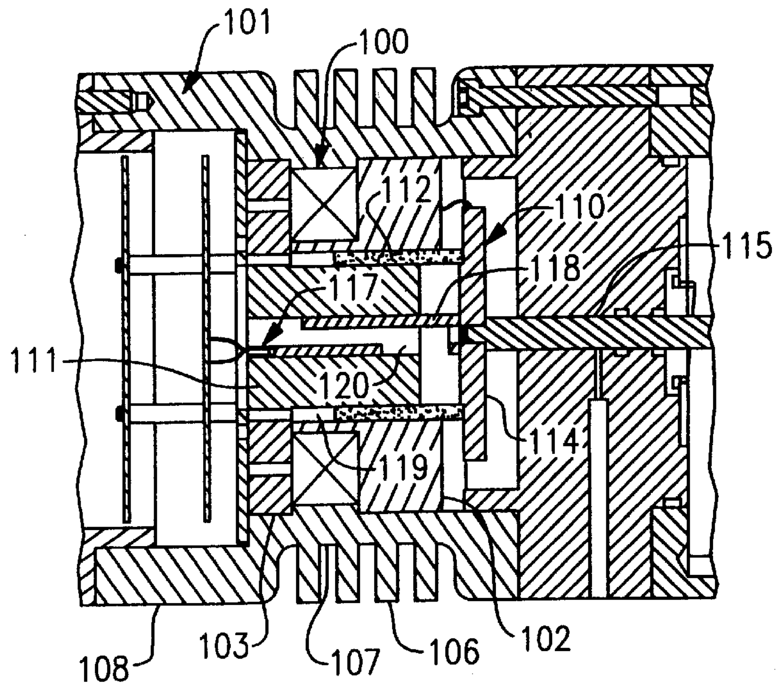
FIG. 5 is an enlarged partial view in section illustrating a further embodiment of the invention.

Turning now to FIG. 5, there is illustrated a further embodiment of the invention wherein the magnet 100 is located within the housing wall 101 between a pair of annular rings 102 and 103. The rings are formed of the same material as the housing having a high coefficient of heat transfer so that heat generated within the actuator is transferred rapidly to a series of fins 106 mounted within an annular recess 107 formed in the outer surface 108 of the housing. As explained with reference to FIG. 4 above, the moving coil assembly 110 surrounds the pole piece 111 that generates a magnet flux field. The coil 112 further includes a head piece 114 that is connected to the valve spool by a connecting rod 115. A position sensor 117 as described above provide accurate position related to the controller. The movable contact of the sensor is mounted upon an arm 118 that forms part of the coil frame and which passes into the coil frame and which passes into a central opening 120 in the pole piece.

The moveable coil, as explained above, is surrounded by transmission oil having a cooling effect on the coil as well as a relatively high heat conductivity. The oil completely fills the cavity 119 between the housing and the pole piece thus eliminating the air gap typically found in the region. Suitable oil seals are provided to maintain the oil within the air gap. Because heat from the coil is transferred directly to the housing wall surrounding the actuator, the need for heat conducting polymers and ferrofluids is also eliminated in this embodiment. As a result, heat generated by the actuator will be rapidly transferred through the necked down section of the housing and the fins into the surrounding ambient.

Figure 6:
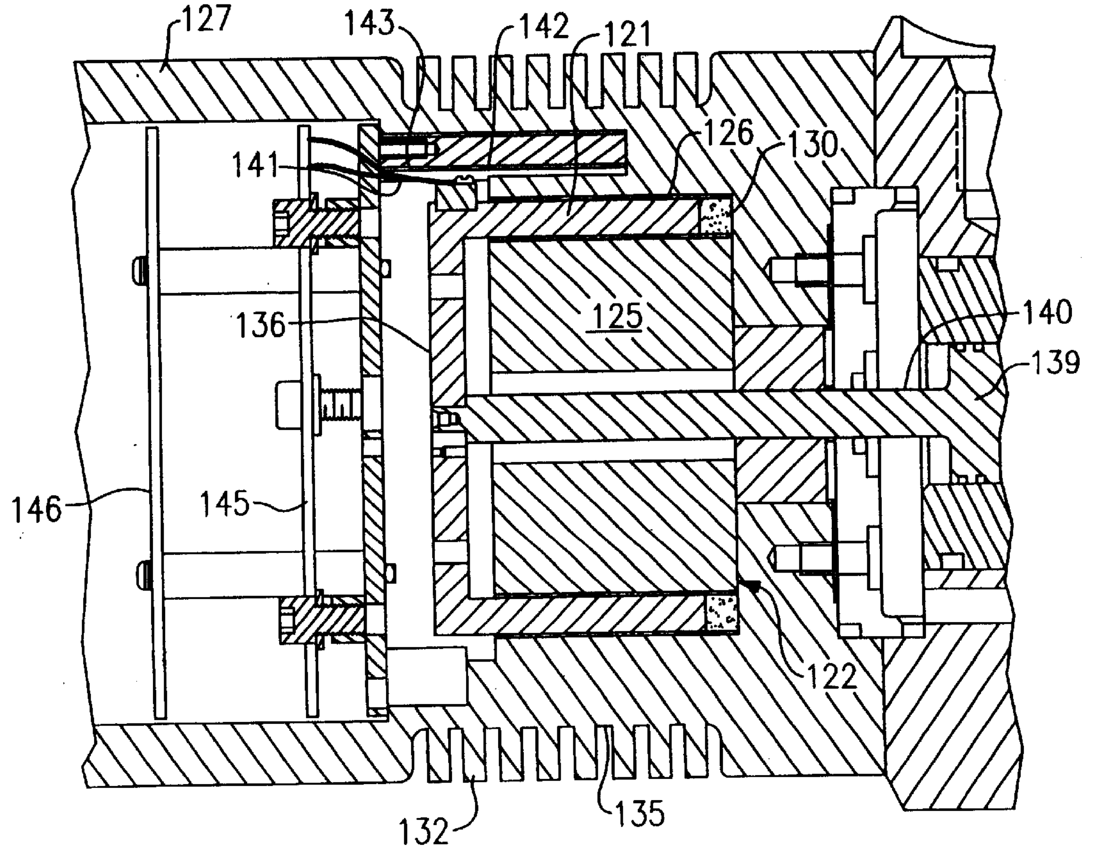
FIG. 6 is also an enlarged partial view in section illustrating a still further embodiment of the invention.

FIG. 6 is a still further embodiment of the present invention wherein the coil assembly 121, as described above in detail with reference to FIG. 4, surrounds the core piece 122 containing magnetic coil 125. The coil assembly is moveable within an annular cavity 126 located between the magnetic core and the housing. Here again, the cavity is filled with a ferrofluid 130, the type noted above, however, because the actuator is now an integral part of the housing, the need for heat conducting polymer is eliminated. Fins 132 are mounted in an annular recess 135 that surrounds the actuator. The coil frame 136 is connected to the valve spool 139 by a connecting rod 140.

In this embodiment of the invention, the sliding contact 141 of the position sensor 142 is mounted on the coil frame while the stationary contact 142 is connected directly to the housing. Suitable electrical lines connect the boards 145 and 146 of the controller to the coil and the position sensor.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A voice coil operated valve that includes:

a housing having a first chamber that contains a valve sleeve and a valve spool mounted for reciprocal movement within the sleeve along a central axis of the housing;

said housing further containing a second chamber located adjacent said first chamber;

a linear voice coil actuator mounted within said second chamber that contains a stationary permanent magnet and a coil holder for movably supporting a coil within the magnetic field of said magnet whereby said holder moves along the axis of the housing when a current is applied to said coil;

connecting means for coupling the coil holder to the valve spool whereby the spool is positioned within the sleeve in response to the current flow through said coil; and a thermally conductive material positioned between adjacent surfaces of the voice coil actuator and the housing for rapidly conducting heat energy from the voice coil actuator to said housing to maintain the voice coil actuator operating temperature below a level at which the coil windings are damaged.

2. The valve of claim 1 that further includes cooling fins mounted upon the outer surface of said housing for rapidly dissipating heat energy from the housing to the surrounding ambient.

3. The valve of claim 1 wherein said magnet includes a cylindrical ferromagnetic core and an outer cylindrical shell surrounding said coreto provide a gap there between in which the coil is situated with the magnetic field of said voice coil actuator.

4. The valve of claim 3 that further includes a ferrofluid contained in the gap, said ferrofluid having a high thermal conductivity such that heat generated by the coil is rapidly transferred to the outer surface of said voice coil actuator unit that is adjacent to the housing.

5. The valve of claim 1 wherein said thermally conductive material is a polymer coating that surrounds the voice coil actuator shell.

6. The valve of claim 5 wherein said polymer has a thermal conductivity of about 1.5 W/mk.

7. The valve of claim 1 that further includes a pair of opposed failsafe springs acting upon said spool which serves to hold the spool in a neutral position when no current is flowing through the coil.

8. The valve of claim 1 wherein said housing is fabricated of a nonpermeable material.

9. An voice coil operated valve that includes:

a cylindrical housing that has a first chamber containing a valve sleeve and a valve spool mounted for reciprocal movement within the sleeve along the central axis of said housing;

said housing further containing a second chamber adjacent said first chamber that is in axial alignment with said first chamber, a linear voice coil actuator mounted within said second chamber, said actuator having a cylindrical ferromagnetic core surrounded by a cylindrical shell to create an assembly having a cylindrical air gap between the core and shell that is axially aligned with the axis of the housing, the ends of said core and shell being in axial alignment;

a cylindrical coil holder passing into the air gap at one end of said core and shell assembly adjacent to said valve sleeve for supporting a coil within said air gap, and a magnet for establishing a flux field within said air gap so that said holder moves axially when a current is applied to said coil;

said valve spool being connected to said coil holder by a coupling means for axial movement therewith;

a radially disposed flange covering the opposite end of said core and shell assembly, said flange extending outwardly beyond the assembly and being seated against a shoulder formed in said second chamber of said housing; and a thermally conductive material positioned between the outer surface of said shell and an adjacent surface of the housing and said material extending radially between the opposite end of said core and shell assembly and the shoulder formed in said second chamber of the housing for rapidly conducting heat energy from the voice coil actuator to said/housing.

10. The valve of claim 9 that further includes a ferrofluid contained in the gap between the shell and the core of the voice coil actuator, said ferrofluid having a high thermal conductivity so that heat energy generated in the voice coil actuator is transferred rapidly to the outer surface of the shell.

11. The valve of claim 9 wherein said conductive material is a polymer coating that covers the outer surface of the same shell and the inner surface of said flange.

12. The valve of claim 11 wherein the thermal conductivity of said conductive material is about 1.5 W/mk.

13. The valve of claim 9 that further includes a digital controller means mounted in said second chamber adjacent to said flange.

14. The valve of claim 13 wherein said digital controller is mounted upon at least one radially disposed circuit board.

15. The valve of claim 13 wherein said digital controller is mounted on a plurality of radially disposed circuit boards mounted axially one behind the other adjacent said flange.

16. The valve of claim 9 wherein said core contains a hole that passes axially therethrough, a stationary contact axially mounted within said hole and a moveable contact mounted on said coil holder for movement therewith so that said moving contact along the stationary contact to provide position data to a controller.

17. The valve of claim 9 that further includes a pair of opposed failsafe springs acting upon said spool which serve to hold the spool in a neutral position when no current is flowing through said coil.

18. The valve of claim 9 further including fins mounted upon the outer surface of the housing for dissipating heat energy from the housing into the surrounding ambient.

19. A voice coil operated valve that includes:

a housing having a first chamber that contains a valve sleeve and a valve spool mounted for reciprocation within the valve sleeve along the axis of the housing and a second chamber adjacent said first chamber, a linear voice coil actuator mounted within said second chamber that contains a magnetic core mounted in axial alignment within a cavity formed in said housing to establish an air gap between the core and the housing whereby a magnetic flux field is located within said air gap, a coil mounted upon a movable frame so that the coil is located within the magnetic flux field, means for connecting the frame to said valve spool, ferrofluids contained in said air gap having a high thermal conductivity for rapidly conducting heat from the voice coil actuator to said housing, and an electric controller mounted in said chamber adjacent to the voice coil actuator and further including a position sensor for coupling the coil frame to the controller.

20. The valve of claim 19 that further includes a necked down section in said housing that overlies the voice coil actuator.

21. The valve of claim 20 that further includes fins mounted within said necked down section for rapidly dissipating heat from the housing into the surrounding ambient.

22. A voice coil operated valve that includes:

a housing having a first chamber that contains a valve sleeve and a valve spool mounted for reciprocation with the valve sleeve along the axis of said housing and a second chamber that is adjacent said first chamber, a linear voice coil actuator mounted within said second chamber that includes a cylindrical pole piece axially aligned with the axis of said housing, an air gap separating the pole piece from the housing wall and a magnet surrounding the pole piece that is mounted within the wall of said housing to establish a magnetic flux field within said air gap, a coil mounted upon a movable frame so that said coil is located within the magnetic flux field, means for connecting said frame to said valve spool, and lubricating oil located within said air gap for cooling said coil and for rapidly conducting heat from said pole piece to said housing.

23. The valve of claim 22 that further includes a necked down section in said housing the overlies the voice coil actuator.

24. The valve of claim 23 that further includes fins in said necked down section for rapidly dissipating heat from the housing into the surrounding ambient.

25. The valve of claim 22 that includes an electrical controller mounted in said second chamber adjacent to the voice coil actuator and further includes a position sensor for coupling the coil frame to the controller.

* * * * *